(12) United States Patent
Legrand et al.

(10) Patent No.: US 10,844,938 B2
(45) Date of Patent: Nov. 24, 2020

(54) ACTUATOR

(71) Applicant: GOODRICH ACTUATION SYSTEMS SAS, Buc (FR)

(72) Inventors: Benjamin Legrand, Versailles (FR); Arnaud De la Chevasnerie, Versailles (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 47 days.

(21) Appl. No.: 15/851,878

(22) Filed: Dec. 22, 2017

(65) Prior Publication Data
US 2018/0180144 A1    Jun. 28, 2018

(30) Foreign Application Priority Data

Dec. 22, 2016    (EP) .................................... 16306782

(51) Int. Cl.
*F16D 23/14*    (2006.01)
*F16H 25/20*    (2006.01)
(Continued)

(52) U.S. Cl.
CPC ......... *F16H 25/2025* (2013.01); *B64C 13/28* (2013.01); *B64C 13/30* (2013.01);
(Continued)

(58) Field of Classification Search
CPC ... B64C 13/28; B64C 13/505; B64C 13/0425; B64C 13/0427; B64C 13/341; B64C 13/504; F16H 25/2025; F16H 25/205; F16H 2025/2071; F16D 23/12; F16D 23/14; F16D 11/00; F16D 11/02; F16D 11/04; F16D 11/06; F16D 11/08; F16D 11/10; F16D 11/12; F16D 11/14; F16D 11/16;
(Continued)

(56) References Cited

U.S. PATENT DOCUMENTS 4,900,182 A    2/1990   Stillwagon
5,086,896 A *  2/1992   Murakami ............... F16D 11/12
                                                      192/107 T
(Continued)

FOREIGN PATENT DOCUMENTS

EP    2840020 A2      2/2015
GB    537409 A   *  12/1939
(Continued)

OTHER PUBLICATIONS

European Search Report for Application No. 16306782.0-1762 dated Jul. 17, 2017.

*Primary Examiner* — Randall J Krug
(74) *Attorney, Agent, or Firm* — Cantor Colburn LLP

(57) ABSTRACT

An actuator is provided with means for controlling whether or not forces are transferred between a cylinder 12 (controlled by a motor of the actuator) and an output shaft 14. The output shaft 14 is located between the cylinder 12 and the control rod 18, 38. The cylinder 12 coaxially surrounds the output shaft 14, and the output shaft 14 in turn coaxially surrounds the control rod 18, 38. The control rod 18, 38 has one or more splines 20 on its outer surface facing the output shaft 12. The output shaft 14 has one or more holes 15, each containing a ball bearing 16.

9 Claims, 6 Drawing Sheets

(51) Int. Cl.
*B64C 13/30* (2006.01)
*F16H 25/22* (2006.01)
*B64C 13/28* (2006.01)

(52) U.S. Cl.
CPC ........... *F16H 25/20* (2013.01); *F16H 25/205* (2013.01); *F16H 25/2233* (2013.01); *F16H 25/2252* (2013.01); *F16H 2025/2071* (2013.01); *F16H 2025/2078* (2013.01)

(58) Field of Classification Search
CPC ......... F16D 2011/002; F16D 2011/004; F16D 2011/006; F16D 2011/008
See application file for complete search history.

(56) References Cited

U.S. PATENT DOCUMENTS

| | | |
|---|---|---|
| 6,237,433 B1 | 5/2001 | Rodrigues |
| 9,088,185 B2 | 7/2015 | Shigetomo et al. |
| 2001/0009632 A1 | 7/2001 | Cross |

FOREIGN PATENT DOCUMENTS

| | | | | |
|---|---|---|---|---|
| GB | 537409 A | * | 6/1941 | ............. F16D 23/12 |
| GB | 797041 A | | 6/1958 | |
| WO | 2005050062 A1 | | 6/2005 | |

\* cited by examiner

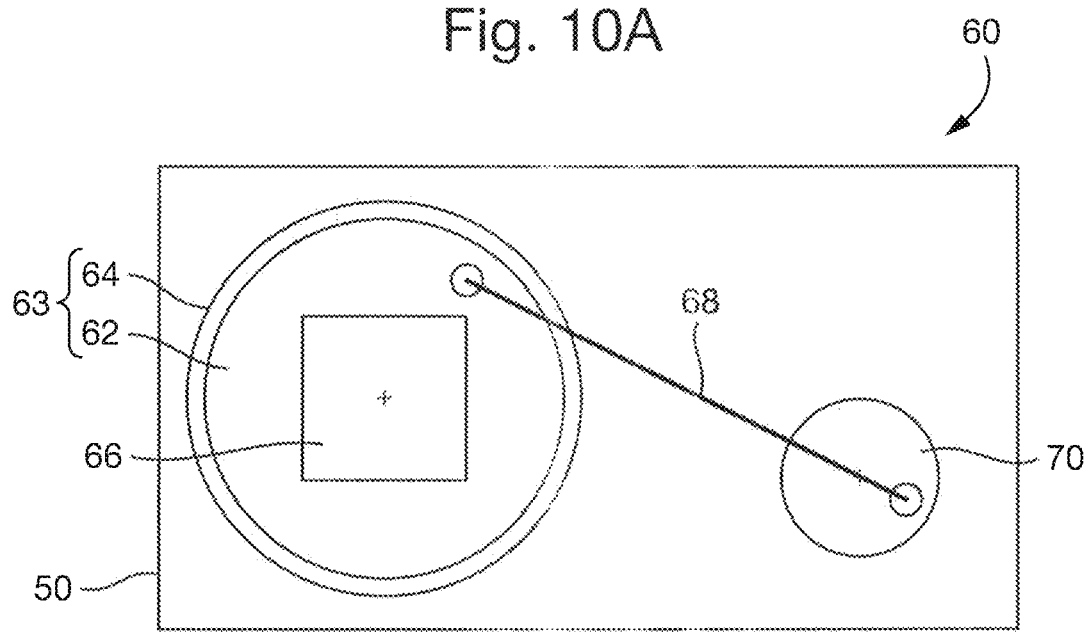
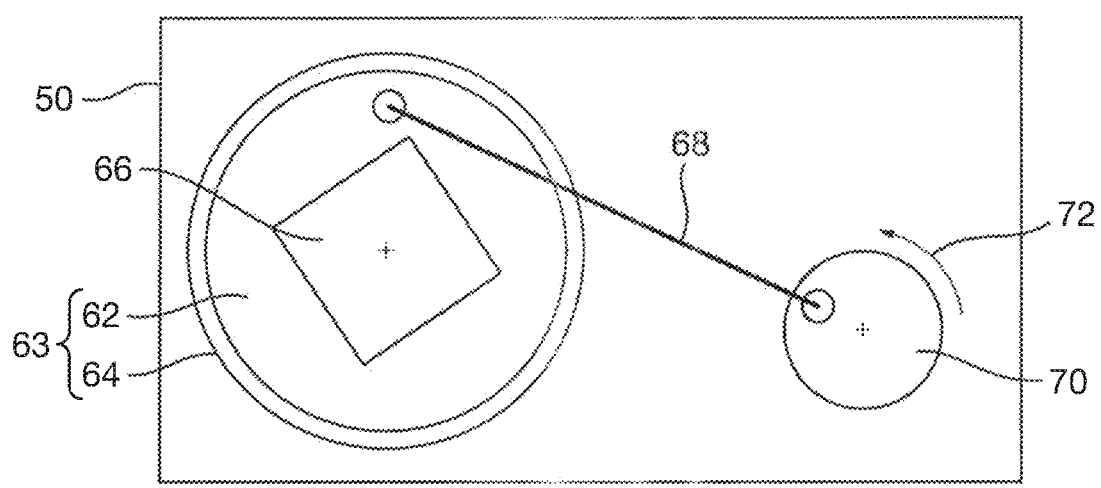

ACTUATOR

FOREIGN PRIORITY

This application claims priority to European Patent Application No. 16306782.0 filed Dec. 22, 2016, the entire contents of which is incorporated herein by reference.

TECHNICAL FIELD

The present disclosure relates to an actuator having an engaged state and a disengaged state.

BACKGROUND

On aircraft, some surfaces are powered by two or more actuators which are attached in parallel to the structure. In many cases, one of the pair of actuators is the principal actuator and the other is a backup in case the principal actuator fails. There is also a current trend to having more electric controls in aircraft to replace older hydraulic/mechanical systems. One risk that has been identified when using an electromechanical actuator (EMA) is the risk of jamming. Should one EMA of a pair become jammed, the surface would be locked in position. This failure may be critical.

Existing solutions rely upon a shear pin to mechanically fail when torque in a (jammed) actuator reaches a certain threshold. Such solutions allow the backup actuator to take over operation of the control surface, but shear pins are single-use and must be replaced during subsequent servicing. They cannot be re-engaged during flight if the jam is removed (e.g. via deicing).

The present actuator allows reengagement after disengagement and does not rely upon breaking of a shear pin. The present actuator is applicable for other uses, such as on ships, submarines, trains, or in installations such as oil rigs and factories where such an actuator may be required.

SUMMARY

According to a first aspect, the disclosure provides an actuator comprising: a control rod having an axis of rotation and a spline extending along the axis, the spline having a top surface; a cylinder coaxial with and extending around the control rod, the cylinder having a circumferential groove formed in an inner surface, the cylinder arranged to be driven axially within the actuator; an output shaft coaxial with and extending around the control rod and located between the control rod and the cylinder, the output shaft having a hole extending therethrough; and a ball bearing located in the hole of the output shaft; wherein, in an engaged position, the ball bearing is retained, by the position of the control rod, in the groove and on the top surface of the spline so as to transmit forces between the cylinder and output shaft; and wherein to disengage the actuator, a control mechanism is configured to move the control rod relative to the output shaft, so as to locate the ball bearing in a recessed portion adjacent the spline, at which position the ball bearing does not engage the groove of the cylinder.

The spline may have a sloping edge that slopes away from the top of the spline to the recessed portion, preferably wherein the sloping edge is a straight sloping edge.

A portion of a wall of the hole in the output shaft may extend towards an inner diameter of the control rod, the portion of the wall being for guiding movement of the ball bearing between the recessed portion and the top of the spline.

The actuator may comprise a first stage comprising: a plurality of splines arranged circumferentially around the control rod; a plurality of grooves arranged circumferentially around the inner surface of the cylinder; a plurality of holes in the output shaft, each hole registerable with one of the splines in at least one relative orientation of the control rod and output shaft; each hole containing a ball bearing.

The actuator may comprise a plurality of stages, wherein specific backlash is set between the ball bearings and the control rod so as to control the actuator stiffness.

The control mechanism may be configured to control relative rotation between the control rod and the output shaft.

The or each recessed portion may be circumferentially adjacent a spline.

The control mechanism may be configured to control relative linear motion along the axis between the control rod and the output shaft.

The or each recessed portion may be located along the axis of the or each spline and formed by a groove cut circumferentially across the or each spline.

DESCRIPTION OF THE FIGURES

Certain embodiments of the present disclosure will now be described in greater detail by way of example only and with reference to the accompanying drawings in which:

FIGS. 10A and 10B show the control mechanism for engaging/disengaging the actuator.

DETAILED DESCRIPTION

Figure 1:
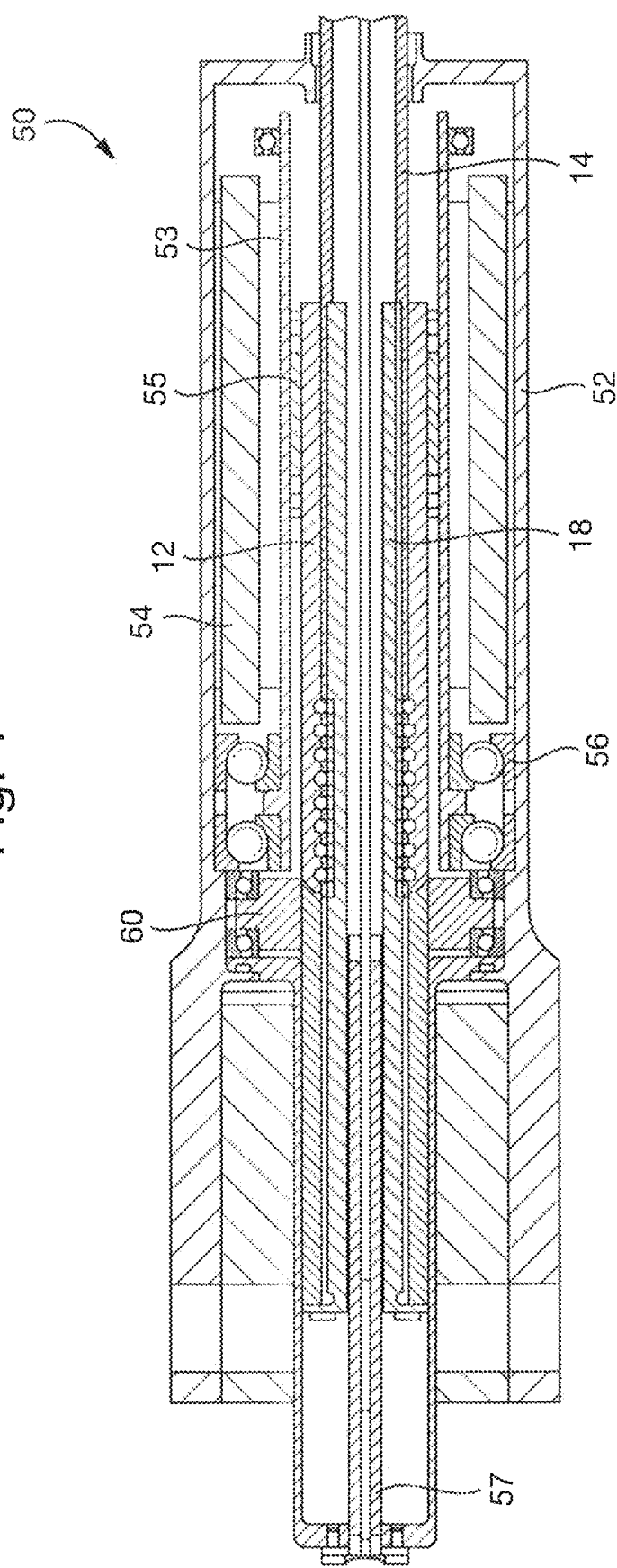
FIG. 1 shows a cross-section of an actuator.

FIG. 1 shows a cross-section of an aircraft actuator 50 for an aircraft. The actuator has a housing 52 containing a motor 54. The motor turns the outer member 53 of an inverted satellite roller screw. The outer member turns rollers 55 that interface with a screw thread (not shown) on the radially outer surface of a cylinder 12. When the motor is activated, the cylinder 12 is moved axially within the actuator housing 52. The cylinder 12 is attached to an output shaft 14 that extends out of the housing 52 of the actuator 50. A control rod 18 sits within the output shaft 14. The control rod 18, the output shaft 14, and the cylinder 12 are all coaxial with one another. The output shaft 14 may be (directly or indirectly) connected to a control surface (not shown) of an airplane, such as a flap or slat. The cylinder 12 and the output shaft 14 are connected together such that in an engaged state (described below) axial movement of the cylinder 12 causes axial movement of the output shaft 14, and in a disengaged state (described below) the cylinder 12 is decoupled from the output shaft 14 and the output shaft 14 is free to move axially within the cylinder 12.

The actuator of FIG. 1 also includes a LVDT 57 for detecting the axial position of the output shaft 18 or a nut associated with the output shaft 18. There is also a control mechanism 60 for controlling the relative rotational orientation of the control rod 18 and the output shaft 14 which, as described below, allows switching between the engaged state and the disengaged state.

The output shaft 14 is held against rotation, e.g. by engagement with the housing as it slides in and out of the housing. In the engaged state, the control rod 18 is held against rotation in a first position by a control mechanism 60. In the disengaged state, the control rod has been rotated by the control mechanism 60 to a second position and is then held against further rotation.

Figure 2:
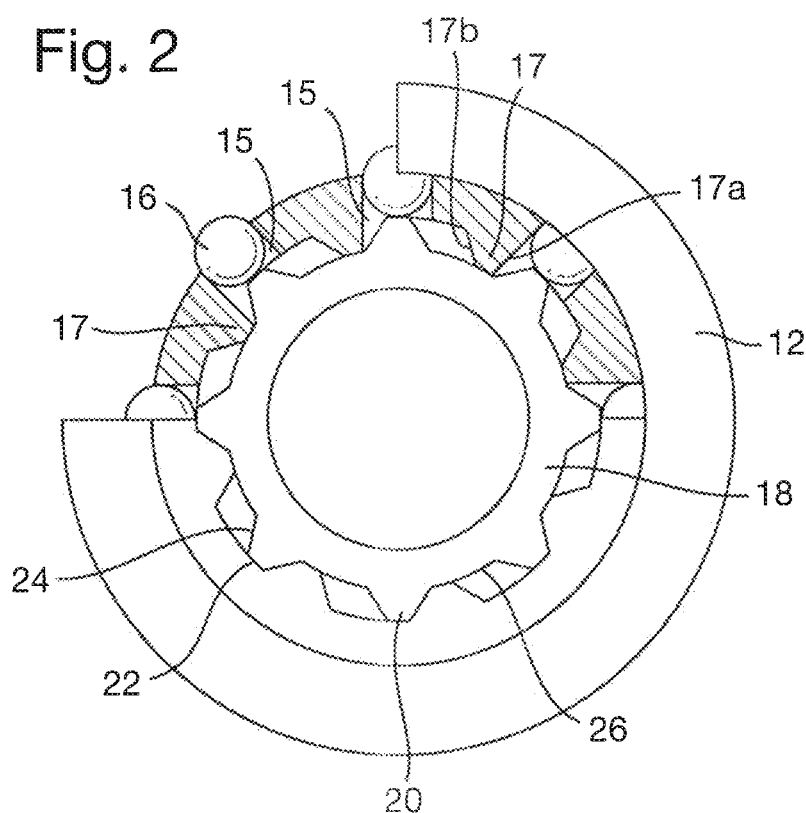
FIG. 2 shows a cross-section of part of the actuator in an engaged state.
Figure 3:
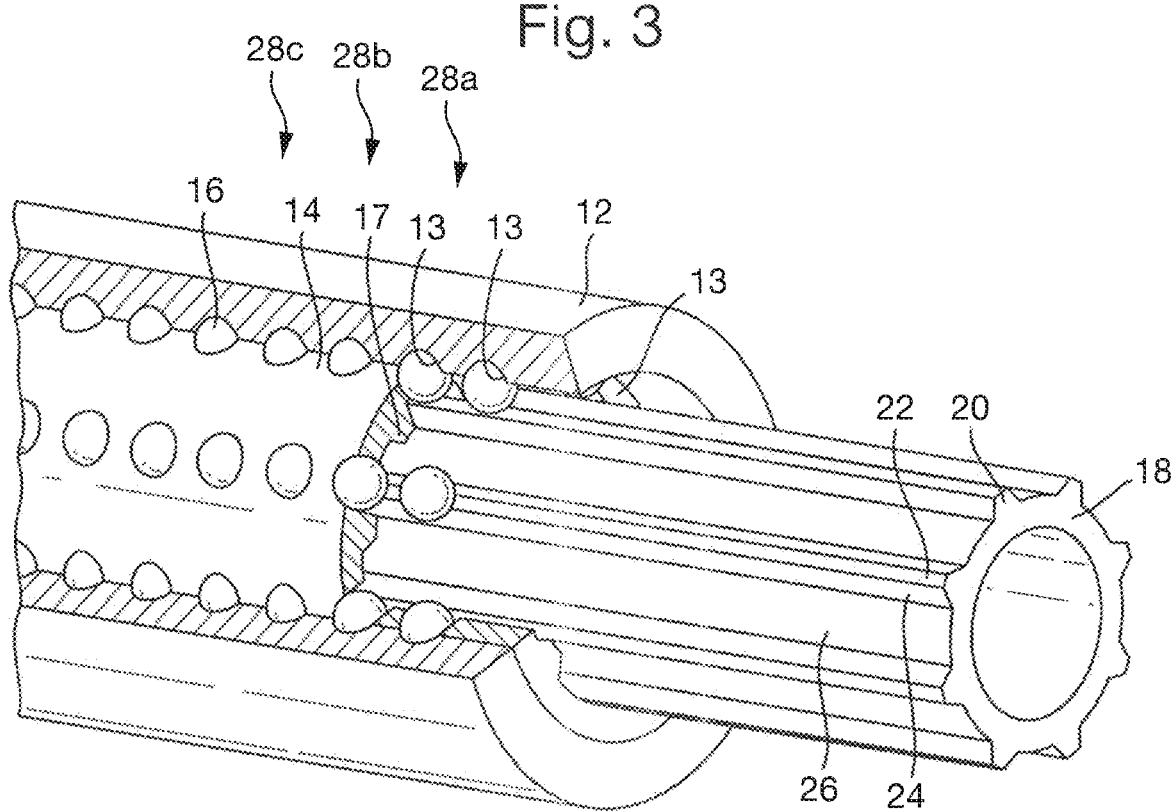
FIG. 3 shows a perspective cutaway view of part of the actuator in the engaged state.

FIGS. 2 and 3 show the actuator in the engaged state. As shown in FIGS. 2 and 3, the output shaft 14 contains a plurality of holes 15 arranged circumferentially around the output shaft 14 and extending radially through the entire thickness of the output shaft 14. Each of the plurality of holes 15 aligns with a respective spline 20 of the control rod 18 in at least one relative orientation of the output shaft 14 and control rod 18. The output shaft 14 may have a plurality of stages 28a, 28b, 28c of holes 15, arranged axially along the length of the output shaft 14.

The cylinder 12 has a plurality of grooves 13, each extending partially into the inner surface of the cylinder 12. Each groove 13 extends circumferentially around the cylinder and the plurality of grooves 13 are arranged axially along the inner surface of the cylinder 12.

When the actuator is engaged, each of the plurality of grooves 13 aligns with a respective stage 28a, 28b, 28c of holes of the output shaft 14.

In the example shown in FIG. 2, there are eight splines 20 arranged at regular intervals around the control rod 18. Therefore, in a first stage 28a there are eight holes 15 arranged at regular intervals around the output shaft 14 aligned with a groove 13 of the cylinder 12. Other examples having different numbers of splines/holes are envisaged, as well as variable circumferential intervals between the splines/holes. The second stage 28b of holes 15 is aligned with a second of the plurality of grooves 13.

Each spline 20 has a generally trapezoidal shape in circumferential cross-section. That is, each spline 20 has a broadly flat top surface 22 and straight sloping sides 24 that slope at an angle to the normal (i.e. radial) direction of the control rod 18. Other spline 20 profiles are envisaged. In particular, the top surface 22 may have a shallow V-shape or U-shaped cross section where the base of the V (or U) points radially inwards towards the centre of the control rod 18. Further, the sloping sides 24 may be curved, for example, semicircular or sinusoidal in profile.

A ball bearing 16 is disposed in each hole 15 of the output shaft 14. Each ball bearing 16 has a diameter such that when one side of the ball bearing 16 is seated in its respective groove 13 of the cylinder 12 (i.e. when the actuator is engaged), the ball bearing 16 extends entirely through the output shaft 14 and engages with the top 22 of its respective spline 20.

In the engaged state, when the cylinder 12 moved axially by the motor 54 of the actuator turning the inverted satellite roller screw, the sides of the grooves 13 bear upon the ball bearings 16, pushing the ball bearings 16 against the sides of their holes 15 in the output shaft 14 and axial forces are thus transferred into the output shaft 14. That is, the ball bearings 16 act as a "pin connection" between the output shaft 14 and the cylinder 12 by extending inside both the holes 15 of the output shaft 14 and the grooves 13 of the cylinder 12.

The holes 15 in the control rod 14 have a diameter very slightly larger than the ball bearing 16 diameter, so as to allow free rotation of the ball bearing 16 in the hole without significant play.

The output shaft 14 may have inwardly extending splines 17, each spline 17 adjacent a respective hole 15 of the output shaft 14. On the side 17a of a given spline 17 adjacent its respective hole, the spline 17 extends purely or substantially radially from an inner surface of the output shaft 14 towards the inner diameter of the control rod 18. On the opposite side 17b of a given spline 17, i.e. opposite the respective hole 15, the spline 17 may have a sloped profile that is complementary to the sloped profile of the next spline 20 around the control rod 18.

To disengage the connection between the cylinder 12 and output shaft 14, the control rod 18 is rotated relative to the output shaft 14. The radially inwardly pointing spline 17 of the output shaft 14, which terminates at or near the base of the sloped surface 24 of its respective control rod spline 20, prevents rotation of the control rod 14 in one direction. However, there is a circumferential gap between the opposite side 17b of that control rod spline 17 and the next spline 20 around the control rod 18. That is, there is significant play between the control rod 18 and the output shaft 14. As described below, this play may be comparable to the diameter of the ball bearing 16.

As the control rod 18 rotates within the output shaft 14, the top surface 22 of each spline 20 moves out from beneath (radially inward side) its respective ball bearing 16. The ball bearing 16 rolls down the sloped side of the spline 20 and into the recessed area 26 adjacent that spline 20. The recessed area 26 is a region of the control rod 18 that is sufficiently radially inward of the top 22 of the spline 20 that the ball bearings 16 do not engage the grooves 13 of the cylinder 12. For example, the recessed area 26 may be at the inner diameter of the control rod 18 (between adjacent splines 20), while the top 22 of the spline 20 defines the outer diameter of the control rod 18.

Figure 4:
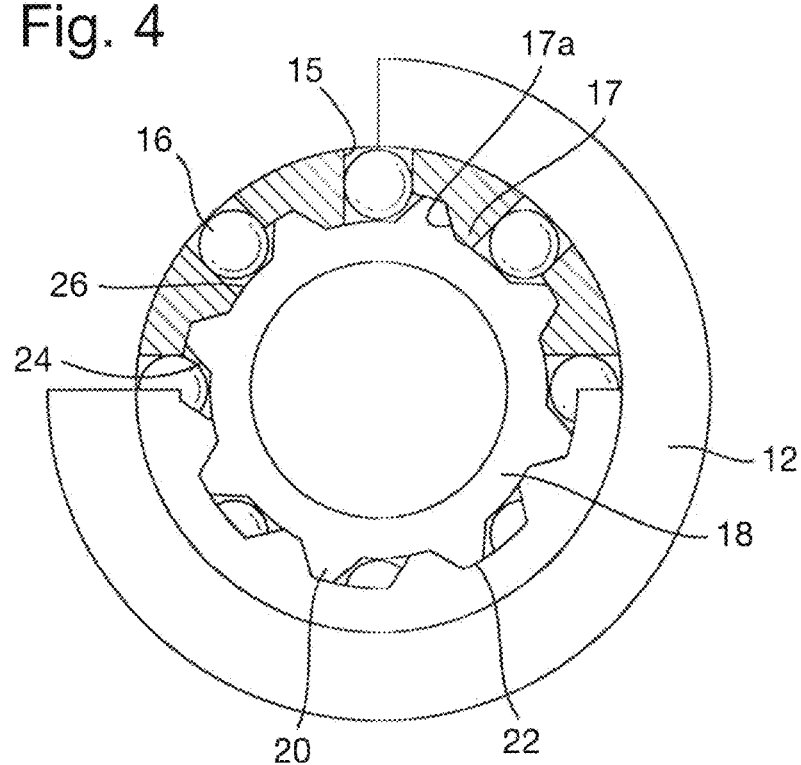
FIG. 4 shows a cross-section of part of the actuator in a disengaged state.
Figure 5:
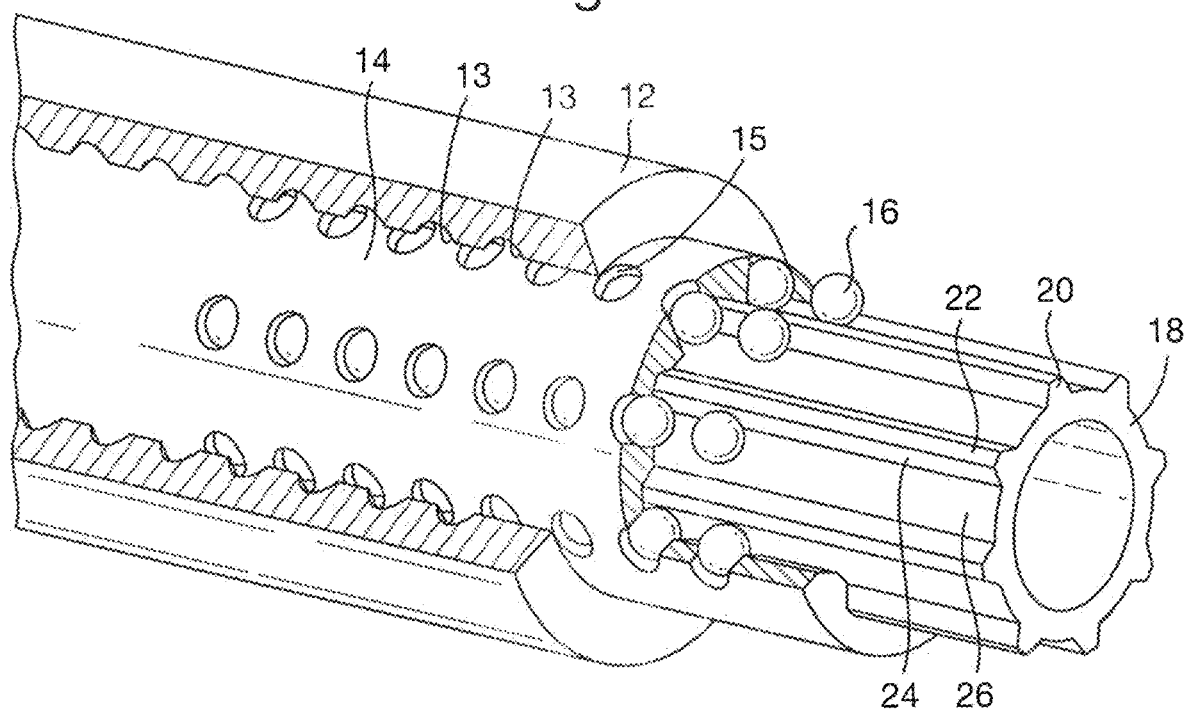
FIG. 5 shows a perspective cutaway view of part of the actuator in the disengaged state.

FIGS. 4 and 5 show the actuator in this disengaged state. Once the opposite side 17b of each control rod spline 17 meets the next spline 20 around the control rod 18, further relative rotation is prevented in that direction. Further relative rotation may additionally be prevented by the control mechanism 60.

As shown in FIG. 4, when the ball bearings 16 are each sitting in the radially inner zone of the control rod 18 (i.e. in the recessed area 26), the ball bearings 16 are no longer held engaged with the grooves 13 of the cylinder 12. Thus, axial movement of the cylinder 12 is not transmitted to the output shaft 14 and vice versa. That is, the actuator is now disengaged.

It will be appreciated that gravity may cause some of the ball bearings 16 (those on the lower side of the control rod 14 with respect to gravity) to fall out of their recessed portions 26 and into abutment with the cylinder 12, when the actuator is disengaged. However, while the actuator is thus disengaged, these ball bearings 16 are not supported on their upper sides (with respect to gravity) and so movement of the grooves 13 past these ball bearings 16 will simply push these ball bearings 16 back into their holes 15, rather than cause undesired re-engagement of the actuator.

To reengage the actuator, the output shaft 14 is moved back to the first position then the control rod 18 is rotated. The radial surface 17a of each output shaft spline 17 bears against its respective ball bearing 16 and pushes the ball bearing 16 back up the sloped surface 24 of the spline 20 to sit atop the spline 20 again. In order for this to happen, the cylinder 12 must be located in a position where the grooves 13 are aligned with the stages 28a, 28b, 28c of holes 15 of the output shaft 14, so as to receive the ball bearings 16. One method for reengaging the actuator is to use a second (similar) actuator that is connected to the same flap or slat, to move the output shaft 14 into position relative to the cylinder 12, and then the control rod 18 may be rotated to reengage the actuator.

Thus, the first example provides an actuator 50 that can be repeatedly engaged/disengaged without mechanical damage to any part, as distinct from prior art devices that use a shear pin. When the actuator is disengaged, the output shaft 14 is free to translate relative to the cylinder 12. This means, for example, that a second (similar) actuator controlling the same flap or slat may continue to control that flap or slap even if the first actuator jams, by disengaging the first actuator by using the method above.

The radial splines 17a of the output shaft 14 are optional and may assist with guiding the ball bearings 16 back up the slopes 24 of the output shaft splines 20.

Having a plurality of stages 28a, 28b, 28b of holes may allow the load to be shared between the different stages of balls 16 depending on the stiffness of the cylinder 12 and of the output shaft 14. Specific backlash between the ball bearings 16 and the output shaft 14 may be set up in order to create the desired stiffness.

A control mechanism 60 for controlling the relative orientation of the control rod 18 within the output shaft 14 is now described in relation to FIGS. 10A and 10B. The inner race 62 of a bearing 63 is attached to an end support 66 of the control rod 18. The outer race 64 of the bearing 63 is fixed relative to the housing 50. A first end of a shaft 68 connects to the inner race 62 at a point off the bearing's 63 axis of rotation (which axis is coaxial with the control rod 18, the output shaft 14, and the cylinder 12). A second end of the shaft 68 connects to a disc 70. The disc 70 is configured to rotate in the same plane as the bearing 63. A clutch motor (not shown), separate from the actuator motor 54, controls rotation of the disc 70.

FIG. 10B shows the actuator in the disengaged position. To disengage the actuator, the clutch motor rotates the disc 70 by 180° (e.g. in the direction of the arrow 72 in FIG. 10B). Rotation of the disc 70 pushes the shaft 68 causing the inner race 62 and therefore the control rod 18 to rotate relative to the output shaft 14, thus disengaging the actuator. To reengage the actuator, the reverse operation is performed wherein the disc is rotated by another 180° (in either direction).

The relative sizes of the disc 70 and the bearing race 62 (specifically, the distance from the respective axes that each end of the shaft 68 is connected) determines the amount of rotation induced in the inner race 62 by 180° rotation of the disc. In one example, the disc 70 and inner race 62 are sized such that 180° rotation of the disc 70 causes approximately alpha° of rotation of the control rod. This exemplary alpha° of rotation corresponds to the amount of rotation required to allow each ball bearing 16 to move from the top of its respective spline 20 into the recessed area 26 adjacent that spline 20.

Other control mechanisms 60 for controlling the engagement/disengagement of the actuator may be used.

A second example is shown in FIGS. 6-9. The second example is an actuator that can be repeatedly engaged/disengaged without mechanical damage to any part. The principles of operation of this actuator are similar to the first example and so only the differences will be described below.

Figure 6:
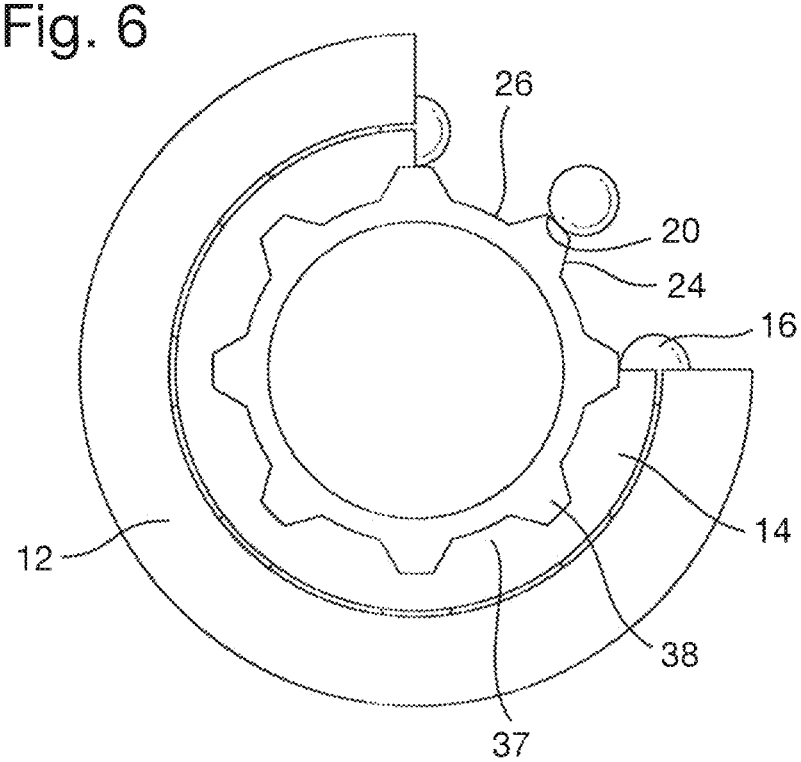
FIG. 6 shows a cross-section of a second example of an actuator in an engaged state.

There is provided a control rod 38 having one or more splines 20. Surrounding, and coaxial with, the control rod 38 is an output shaft 14 having holes 15 extending radially therethrough. Surrounding the output shaft 14 is a cylinder 12 that may be moved linearly along its axis by a motor (e.g. motor 54). The control rod 38 is held by a control mechanism against linear movement relative to the output shaft 14. A control mechanism controls the engagement/disengagement of the actuator by controlling relative linear movement between the control rod 38 and output shaft 14. As shown in FIG. 6, inward facing splines 37 on the output shaft 14 may be provided to completely fill the spaces between adjacent splines 20 of the control rod 38, so as to prevent relative rotation of the control rod 38 and output shaft 14.

A plurality of axially spaced grooves 40 cut circumferentially around the axis of the control rod 38, cutting through the splines 20. As described below, these grooves 40 provide the recessed area 36 where the ball bearings 16 are located in the disengaged state.

As in the first example, in the engaged state, the ball bearings 16 are held on one side in grooves 13 of the cylinder 12. The ball bearings 16 extend through the output shaft 14 and onto the tops 22 of the splines 20 of the control rod 18. Linear forces from the screw shaft 34 (e.g. from a motor 54) are transmitted via the grooves 13, through the ball bearings 16, and into the output shaft 14.

Figure 7:
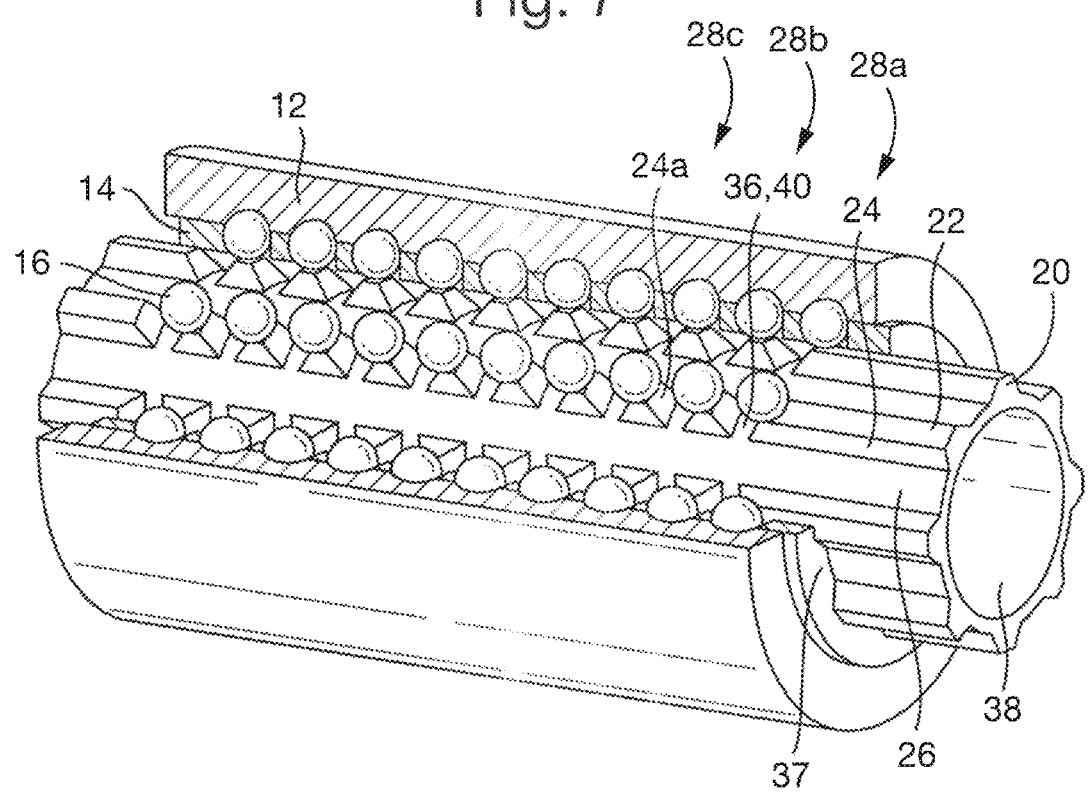
FIG. 7 shows a perspective cutaway view of the second actuator in the engaged state.
Figure 8:
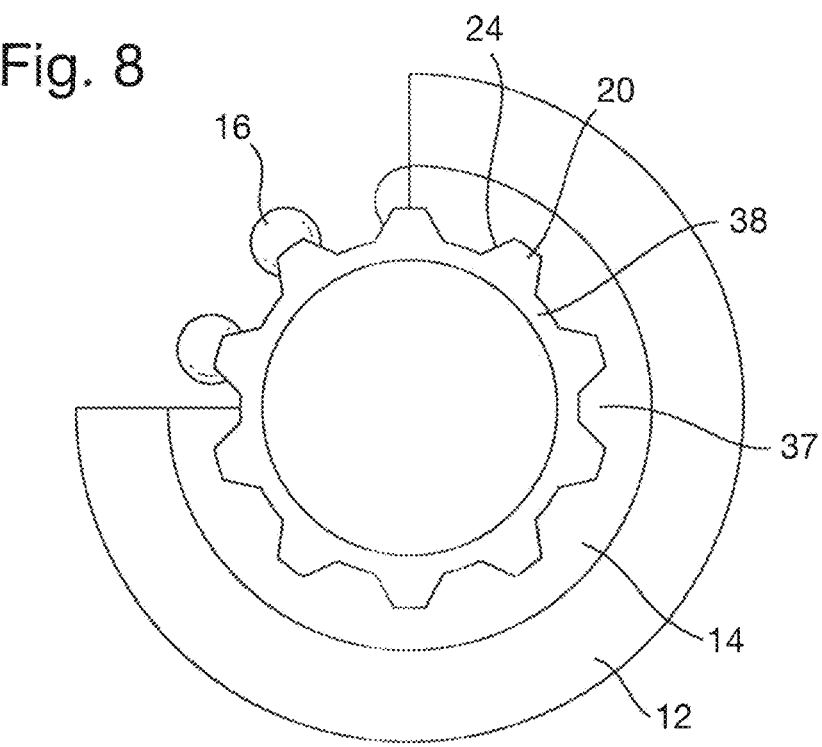
FIG. 8 shows a cross-section of the second actuator in a disengaged state.
Figure 9:
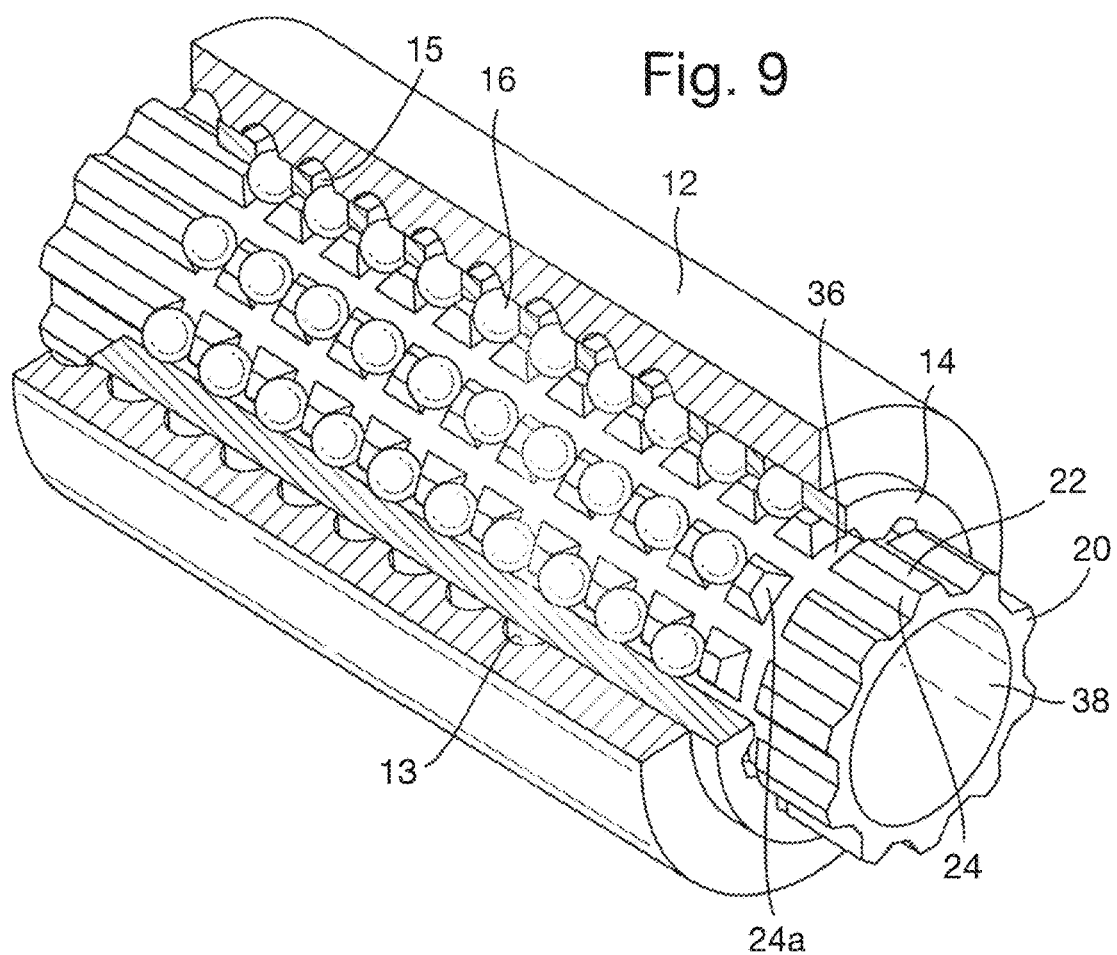
FIG. 9 shows a perspective cutaway view of part of the second actuator in the disengaged state.

To disengage the actuator, the control mechanism moves the control rod 38 axially relative to the output shaft 14, such that the ball bearings 16 may fall into their respective grooves 40. That is, the ball bearings 16 fall into a recessed area 36 adjacent their spline 20. The ball bearings 16 thus are not held in engagement with the grooves 13 of the cylinder 12 and thus the output shaft is disengaged from the cylinder 12. As in the first example, the recessed area 36 is a region of the control rod 38 that is sufficiently radially inward of the top 22 of the spline 20 that the ball bearings 16 do not engage the grooves 13 of the cylinder 12. For example, as shown in FIG. 7, a recessed area 36 is formed in a region where the groove 40 has cut through a spline 20 of the control rod 38.

In this second example, it will be noted that each recessed area 36 is axially along a given spline 20 of the control rod 18, whereas in the first example, each recessed area 26 is circumferentially next to a given spline 20.

In the disengaged state of the actuator, relative linear motion is freely allowed between the cylinder 12, on the one hand, and the output shaft 14 on the other. A mechanical stop (not shown) may be provided at the full extension of the output shaft 14 so as to prevent autodisassembly of the actuator 50 when the actuator is disengaged.

To reengage the actuator, the control rod 38 is linearly moved back to the first position. The sides of each control rod hole 15 bears against its respective ball bearing 16 and pushes the ball bearing 16 back up the sloped surface 24a of the groove 40 to sit atop the spline 20 again. Before this, the cylinder 12 must be located in a position where the grooves 13 are again aligned proximate with the stages of holes 28a, 28b, 28c of the output shaft 14, so the ball bearings 16 may readily slot back into the grooves 13.

Similar to the sides of the splines in the first example, the grooves 40 may have a linear sloping surface 24a or a curved sloping surface 24a, as desired. The width of the grooves 40 measured along the output shaft axis must be long enough to retain the ball bearings 16 sufficiently far radially inward so that the ball bearings 16 do not engage the grooves 13 of the cylinder 12.

As with the first example, the output shaft 14 may be provided with a plurality of stages 28a, 28b, 28c of holes along the axis of the control rod 14, where a first stage 28a is the (circumferentially arranged) plurality of holes 16 hereinbefore described, and each successive stage 28b, 28c of holes 15 is identical to the first stage 28a, but at a different axial position along the control rod 34, adjacent a respective groove 40 in the control rod 38. This may allow the load to be shared between the different stages 28a, 28b, 28c of ball bearings 16 depending on the stiffness of the cylinder 12 and of the output shaft 14. Specific backlash between ball bearings 16 and the output shaft 14 may be set up in order to create the desired stiffness.

The invention claimed is:

1. A linear actuator comprising:
    a housing
    a control rod having an axis of rotation and a spline extending along the axis, the spline having a top surface;
    a cylinder coaxial with and extending around the control rod, the cylinder having a circumferential groove formed in an inner surface, the cylinder arranged to be driven axially within the housing;
    an output shaft coaxial with and extending around the control rod and located between the control rod and the cylinder,
    the output shaft having a hole extending therethrough; and
    a ball bearing located in the hole of the output shaft;
    wherein, in an engaged position, the ball bearing is retained, by the position of the control rod, in the groove and on the top surface of the spline so as to transmit forces between the cylinder and output shaft; and
    wherein the control rod is configured to move relative to the output shaft, so as to locate the ball bearing in a recessed portion adjacent the spline, at which position the ball bearing does not engage the groove of the cylinder, and the actuator is disengaged;
    wherein the output shaft is held against rotation by engagement with the housing.

2. The actuator according to claim 1, wherein a portion of a wall of the hole in the output shaft extends towards an inner diameter of the control rod, the portion of the wall being for guiding movement of the ball bearing between the recessed portion and the top of the spline.

3. The actuator according to claim 1, wherein the recessed portion is circumferentially adjacent a spline.

4. The actuator according to claim 1, wherein the recessed portion is located along the axis of the or each spline and is formed by a groove cut circumferentially across the or each spline.

5. The actuator according to claim 1, wherein:
    the control rod is configured to rotate relative to the output shaft, so as to locate the ball bearing in the recessed portion adjacent the spline, at which position the ball bearing does not engage the groove of the cylinder, and the actuator is disengaged.

6. The actuator according to claim 1, wherein the spline has a sloping edge that slopes away from the top of the spline to the recessed portion.

7. The actuator according to claim 6, wherein the sloping edge is a straight sloping edge.

8. The actuator according to claim 1, comprising a first stage comprising:
    a plurality of splines arranged circumferentially around the control rod;
    a plurality of grooves arranged circumferentially around the inner surface of the cylinder;
    a plurality of holes in the output shaft, each hole registerable with one of the splines in at least one relative orientation of the control rod and output shaft;
    each hole containing a ball bearing.

9. The actuator according to claim 8, comprising a plurality of stages, wherein a specific backlash is set between the ball bearings and the control rod so as to control the actuator stiffness.

* * * * *